US007487515B1

(12) United States Patent
Jones et al.

(10) Patent No.: US 7,487,515 B1
(45) Date of Patent: Feb. 3, 2009

(54) PROGRAMMABLE OBJECT MODEL FOR EXTENSIBLE MARKUP LANGUAGE SCHEMA VALIDATION

(75) Inventors: Brian Jones, Redmond, WA (US); Marcin Sawicki, Kirkland, WA (US); Robert Little, Redmond, WA (US); Mark Sunderland, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 645 days.

(21) Appl. No.: 10/731,598

(22) Filed: Dec. 9, 2003

(51) Int. Cl.
*G06F 3/00* (2006.01)
*G06F 3/048* (2006.01)

(52) U.S. Cl. ....................... 719/328; 715/239
(58) Field of Classification Search ................ 719/331, 719/328; 715/239
See application file for complete search history.

(56) References Cited

U.S. PATENT DOCUMENTS

| 4,674,065 | A | 6/1987 | Lange et al. ................ 382/311 |
|---|---|---|---|
| 4,868,750 | A | 9/1989 | Kucera et al. ................ 711/2 |
| 5,020,019 | A | 5/1991 | Ogawa ........................ 707/5 |
| 5,128,865 | A | 7/1992 | Sadler ........................ 704/2 |
| 5,159,552 | A | 10/1992 | van Gasteren et al. ......... 704/1 |
| 5,267,155 | A | 11/1993 | Buchanan et al. ........... 715/540 |
| 5,317,546 | A | 5/1994 | Balch et al. ................ 368/9 |
| 5,337,233 | A | 8/1994 | Hofert et al. ............. 715/540 |
| 5,341,293 | A | 8/1994 | Vertelney et al. ........... 715/530 |
| 5,351,190 | A | 9/1994 | Kondo ........................ 704/8 |
| 5,392,386 | A | 2/1995 | Chalas ..................... 715/841 |
| 5,446,891 | A | 8/1995 | Kaplan et al. .............. 395/600 |
| 5,541,836 | A | 7/1996 | Church et al. ............... 704/7 |
| 5,596,700 | A | 1/1997 | Darnell et al. ............. 715/512 |
| 5,617,565 | A | 4/1997 | Augenbraun et al. ........ 395/604 |
| 5,625,783 | A | 4/1997 | Ezekiel et al. ............. 395/352 |
| 5,627,958 | A | 5/1997 | Potts et al. ................ 715/708 |

(Continued)

FOREIGN PATENT DOCUMENTS

EP 0481784 A2 4/1992

(Continued)

OTHER PUBLICATIONS

Shim, JC, System and method for offering advertisement on space of cyber document, Oct. 12, 2002.*

(Continued)

*Primary Examiner*—Meng-Ai An
*Assistant Examiner*—Lechi Truong
(74) *Attorney, Agent, or Firm*—Merchant & Gould, PC

(57) ABSTRACT

A programmable object model includes a plurality of object-oriented message calls for application programming interfaces allowing a user to programmatically access the schema validation model of an application by sending message calls and required parameters to the schema validation model to customize or otherwise modify the operation of the schema validation model as desired by the user. Once the user has access to the schema validation model of an application, the user may attach Extensible Markup Language (XML) schema files to a document and control definitions, grammatical rules, and other settings dictated by the attached XML schema file. The user also is allowed to customize the application's native schema validation functionality with user-defined rules and error text. The XML schema validation model of an application may be accessed from a user-created program written according to a variety of different languages such as C, C++, C#, and Visual Basic.

20 Claims, 4 Drawing Sheets

U.S. PATENT DOCUMENTS

| | | | |
|---|---|---|---|
| 5,634,019 A | 5/1997 | Koppolu et al. | 715/744 |
| 5,640,560 A | 6/1997 | Smith | 395/615 |
| 5,657,259 A | 8/1997 | Davis et al. | 708/204 |
| 5,708,825 A | 1/1998 | Sotomayor | 395/762 |
| 5,717,923 A | 2/1998 | Dedrick | 395/613 |
| 5,752,022 A | 5/1998 | Chiu et al. | 395/610 |
| 5,761,689 A | 6/1998 | Rayson et al. | 707/533 |
| 5,781,189 A | 7/1998 | Holleran et al. | 715/826 |
| 5,781,904 A | 7/1998 | Oren et al. | 707/100 |
| 5,787,413 A | 7/1998 | Kauffman et al. | 707/2 |
| 5,794,257 A | 8/1998 | Liu et al. | 707/501 |
| 5,802,253 A | 9/1998 | Gross et al. | 395/51 |
| 5,802,262 A | 9/1998 | Van De Vanter | 395/180 |
| 5,802,299 A | 9/1998 | Logan et al. | 395/200.48 |
| 5,802,530 A | 9/1998 | van Hoff | 707/513 |
| 5,805,911 A | 9/1998 | Miller | 395/796 |
| 5,809,318 A | 9/1998 | Rivette et al. | 715/512 |
| 5,815,830 A | 9/1998 | Anthony | 707/6 |
| 5,818,447 A | 10/1998 | Wolf et al. | 715/752 |
| 5,821,931 A | 10/1998 | Berquist et al. | 715/784 |
| 5,822,539 A | 10/1998 | van Hoff | 395/200.66 |
| 5,826,025 A | 10/1998 | Gramlich | 395/200.47 |
| 5,845,077 A | 12/1998 | Fawcett | 709/221 |
| 5,855,007 A | 12/1998 | Jovicic et al. | 705/14 |
| 5,859,636 A | 1/1999 | Pandit | 715/501.1 |
| 5,872,973 A | 2/1999 | Mitchell et al. | 395/685 |
| 5,875,443 A | 2/1999 | Nielsen | 707/2 |
| 5,892,919 A | 4/1999 | Nielsen | 395/200.58 |
| 5,893,073 A | 4/1999 | Kasso et al. | 705/8 |
| 5,895,461 A | 4/1999 | De La Huerga et al. | 707/1 |
| 5,896,321 A | 4/1999 | Miller et al. | 365/189.01 |
| 5,900,004 A | 5/1999 | Gipson | 707/530 |
| 5,913,214 A | 6/1999 | Madnick et al. | 707/10 |
| 5,920,859 A | 7/1999 | Li | 707/5 |
| 5,924,099 A | 7/1999 | Guzak et al. | 707/100 |
| 5,933,498 A | 8/1999 | Schneck et al. | 705/54 |
| 5,946,647 A | 8/1999 | Miller et al. | 704/9 |
| 5,948,061 A | 9/1999 | Merriman et al. | 709/219 |
| 5,956,681 A | 9/1999 | Yamakita | 704/260 |
| 5,974,413 A | 10/1999 | Beauregard et al. | 707/6 |
| 5,995,756 A | 11/1999 | Hermann | 395/712 |
| 6,006,265 A | 12/1999 | Rangan et al. | 709/226 |
| 6,006,279 A | 12/1999 | Hayes | 719/328 |
| 6,014,616 A | 1/2000 | Kim | 704/8 |
| 6,028,605 A | 2/2000 | Conrad et al. | 345/840 |
| 6,052,531 A | 4/2000 | Waldin et al. | 717/170 |
| 6,061,516 A | 5/2000 | Yoshikawa et al. | 717/109 |
| 6,067,087 A | 5/2000 | Krauss et al. | 715/762 |
| 6,085,201 A | 7/2000 | Tso | 715/505 |
| 6,092,074 A | 7/2000 | Rodkin et al. | 707/102 |
| 6,108,674 A | 8/2000 | Murakami et al. | 715/515 |
| 6,112,209 A | 8/2000 | Gusack | 707/101 |
| 6,121,968 A | 9/2000 | Arcuri et al. | 345/352 |
| 6,122,647 A | 9/2000 | Horowitz et al. | 707/513 |
| 6,126,306 A | 10/2000 | Ando | 708/605 |
| 6,137,911 A | 10/2000 | Zhilyaev | 382/225 |
| 6,141,005 A | 10/2000 | Hetherington et al. | 715/866 |
| 6,151,643 A | 11/2000 | Cheng et al. | 710/36 |
| 6,154,738 A | 11/2000 | Call | 707/4 |
| 6,167,568 A | 12/2000 | Gandel et al. | 717/176 |
| 6,173,316 B1 | 1/2001 | De Boor et al. | 709/218 |
| 6,182,029 B1 | 1/2001 | Friedman | 704/9 |
| 6,185,550 B1 | 2/2001 | Snow et al. | 707/1 |
| 6,185,576 B1 | 2/2001 | McIntosh | 707/200 |
| 6,199,046 B1 | 3/2001 | Heinzle et al. | 705/1 |
| 6,199,081 B1 | 3/2001 | Meyerzon et al. | 715/513 |
| 6,219,698 B1 | 4/2001 | Iannucci et al. | 709/221 |
| 6,262,728 B1 | 7/2001 | Alexander | 345/440.1 |
| 6,272,074 B1 | 8/2001 | Winner | 368/10 |
| 6,272,505 B1 | 8/2001 | De La Huerga | 707/501 |
| 6,292,768 B1 | 9/2001 | Chan | 704/1 |
| 6,295,061 B1 | 9/2001 | Park et al. | 715/764 |
| 6,308,171 B1 | 10/2001 | De La Huerga | 707/3 |
| 6,311,177 B1 | 10/2001 | Dauerer et al. | 707/2 |
| 6,311,194 B1 | 10/2001 | Sheth et al. | 715/505 |
| 6,323,853 B1 | 11/2001 | Hedloy | 345/339 |
| 6,336,125 B2 | 1/2002 | Noda et al. | 715/531 |
| 6,336,131 B1 | 1/2002 | Wolfe et al. | 709/203 |
| 6,338,059 B1 | 1/2002 | Fields et al. | 707/4 |
| 6,347,398 B1 | 2/2002 | Parthasarathy et al. | 717/170 |
| 6,349,295 B1 | 2/2002 | Tedesco et al. | 707/3 |
| 6,353,926 B1 | 3/2002 | Parthesarathy et al. | 717/11 |
| 6,424,979 B1 | 7/2002 | Livingston et al. | 715/511 |
| 6,434,567 B1 | 8/2002 | De La Huerga | 707/102 |
| 6,438,545 B1 | 8/2002 | Beauregard et al. | 707/6 |
| 6,477,510 B1 | 11/2002 | Johnson | 705/30 |
| 6,480,860 B1 | 11/2002 | Monday | 707/102 |
| 6,493,006 B1 | 12/2002 | Gourdol et al. | 345/825 |
| 6,516,321 B1 | 2/2003 | De La Huerga | 707/102 |
| 6,519,603 B1 | 2/2003 | Bays et al. | 707/102 |
| 6,546,433 B1 | 4/2003 | Matheson | 709/318 |
| 6,556,984 B1 | 4/2003 | Zien | 707/2 |
| 6,571,241 B1 | 5/2003 | Nosohara | 707/6 |
| 6,618,733 B1 | 9/2003 | White et al. | 707/103 |
| 6,623,527 B1 | 9/2003 | Hamzy | 715/513 |
| 6,625,581 B1 | 9/2003 | Perkowski | 705/27 |
| 6,629,079 B1 | 9/2003 | Spiegel et al. | 705/26 |
| 6,631,519 B1 | 10/2003 | Nicholson et al. | 717/169 |
| 6,636,880 B1 | 10/2003 | Bera | 708/206 |
| 6,643,633 B2 | 11/2003 | Chau et al. | 707/1 |
| 6,658,623 B1 | 12/2003 | Schilit et al. | 715/513 |
| 6,687,485 B2 | 2/2004 | Hopkins et al. | 434/350 |
| 6,697,824 B1 | 2/2004 | Bowman-Amuah | 709/229 |
| 6,708,189 B1 | 3/2004 | Fitzsimons et al. | 707/205 |
| 6,715,144 B2 | 3/2004 | Daynes et al. | 717/174 |
| 6,717,593 B1 | 4/2004 | Jennings | 715/760 |
| 6,718,516 B1 | 4/2004 | Claussen et al. | 715/513 |
| 6,728,679 B1 | 4/2004 | Strubbe et al. | 704/270.1 |
| 6,732,090 B2 | 5/2004 | Shanahan et al. | 707/3 |
| 6,732,361 B1 | 5/2004 | Andreoli et al. | 719/313 |
| 6,745,208 B2 | 6/2004 | Berg et al. | 707/201 |
| 6,779,154 B1 * | 8/2004 | Nussbaum et al. | 715/523 |
| 6,795,808 B1 | 9/2004 | Strubbe et al. | 704/275 |
| 6,826,726 B2 | 11/2004 | Hsing et al. | 715/513 |
| 6,868,525 B1 | 3/2005 | Szabo | 715/738 |
| 6,874,143 B1 | 3/2005 | Murray et al. | 717/173 |
| 6,880,129 B1 | 4/2005 | Lee et al. | 715/763 |
| 6,883,137 B1 | 4/2005 | Girardot et al. | 715/513 |
| 6,915,303 B2 | 7/2005 | Kauffman | 707/102 |
| 6,925,457 B2 | 8/2005 | Britton et al. | 707/1 |
| 6,925,470 B1 | 8/2005 | Sangudi et al. | 707/102 |
| 6,948,133 B2 | 9/2005 | Haley | 715/780 |
| 7,047,488 B2 | 5/2006 | Ingersoll et al. | 715/235 |
| 7,143,343 B2 * | 11/2006 | Bender et al. | 715/241 |
| 2001/0029605 A1 | 10/2001 | Forbes et al. | 717/11 |
| 2001/0041328 A1 | 11/2001 | Fisher | 434/157 |
| 2001/0056461 A1 | 12/2001 | Kampe et al. | 709/201 |
| 2002/0004803 A1 | 1/2002 | Serebrennikov | 715/513 |
| 2002/0007309 A1 | 1/2002 | Reynar | 705/14 |
| 2002/0026450 A1 | 2/2002 | Kuramochi | 707/104.1 |
| 2002/0029304 A1 | 3/2002 | Reynar et al. | 709/332 |
| 2002/0035581 A1 | 3/2002 | Reynar et al. | 715/513 |
| 2002/0065110 A1 | 5/2002 | Enns et al. | 455/566 |
| 2002/0065891 A1 | 5/2002 | Malik | 709/206 |
| 2002/0066073 A1 | 5/2002 | Lienhard et al. | 717/105 |
| 2002/0078222 A1 | 6/2002 | Compas et al. | 709/232 |
| 2002/0091803 A1 | 7/2002 | Imamura et al. | 709/220 |
| 2002/0100036 A1 | 7/2002 | Moshir et al. | 717/173 |
| 2002/0103829 A1 * | 8/2002 | Manning et al. | 707/513 |
| 2002/0104080 A1 | 8/2002 | Woodard et al. | 717/176 |
| 2002/0120685 A1 | 8/2002 | Srivastava et al. | 709/203 |
| 2002/0129107 A1 | 9/2002 | Loughran et al. | 709/206 |
| 2002/0133523 A1 | 9/2002 | Ambler et al. | 707/536 |
| 2002/0149601 A1 | 10/2002 | Rajarajan et al. | 345/619 |

| | | | | |
|---|---|---|---|---|
| 2002/0156792 | A1 | 10/2002 | Gombocz et al. | 707/100 |
| 2002/0178008 | A1 | 11/2002 | Reynar | 704/272 |
| 2002/0178182 | A1 | 11/2002 | Wang et al. | 715/501.1 |
| 2002/0184247 | A1 | 12/2002 | Jokela et al. | 707/204 |
| 2002/0188941 | A1 | 12/2002 | Cicciarelli et al. | 717/175 |
| 2002/0196281 | A1 | 12/2002 | Audleman et al. | 345/762 |
| 2002/0198909 | A1 | 12/2002 | Huynh et al. | 707/513 |
| 2003/0002391 | A1 | 1/2003 | Biggs | 368/82 |
| 2003/0005411 | A1 | 1/2003 | Gerken | 717/120 |
| 2003/0009489 | A1 | 1/2003 | Griffin | 707/500 |
| 2003/0025728 | A1 | 2/2003 | Ebbo et al. | 345/744 |
| 2003/0051236 | A1 | 3/2003 | Pace et al. | 717/177 |
| 2003/0056207 | A1 | 3/2003 | Fischer et al. | 717/174 |
| 2003/0081791 | A1 | 5/2003 | Erickson et al. | 380/282 |
| 2003/0084138 | A1 | 5/2003 | Tavis et al. | 709/223 |
| 2003/0097318 | A1 | 5/2003 | Yu et al. | 705/35 |
| 2003/0101204 | A1 | 5/2003 | Watson | 708/206 |
| 2003/0101416 | A1 | 5/2003 | McInnes et al. | 715/513 |
| 2003/0106040 | A1 | 6/2003 | Rubin et al. | 717/106 |
| 2003/0121033 | A1 | 6/2003 | Peev et al. | 717/175 |
| 2003/0126136 | A1 | 7/2003 | Omoigui | 707/10 |
| 2003/0135825 | A1 | 7/2003 | Gertner et al. | 715/513 |
| 2003/0140308 | A1 | 7/2003 | Murthy et al. | 715/500 |
| 2003/0145197 | A1* | 7/2003 | Lee et al. | 713/155 |
| 2003/0154144 | A1 | 8/2003 | Pokorny et al. | 705/28 |
| 2003/0158841 | A1 | 8/2003 | Britton et al. | 707/3 |
| 2003/0158851 | A1 | 8/2003 | Britton et al. | 707/100 |
| 2003/0172343 | A1 | 9/2003 | Leymaster et al. | 715/500 |
| 2003/0192040 | A1 | 10/2003 | Vaughan | 717/173 |
| 2003/0208498 | A1 | 11/2003 | Feinberg et al. | 707/100 |
| 2003/0212527 | A1 | 11/2003 | Moore et al. | 702/179 |
| 2003/0220795 | A1 | 11/2003 | Araysantiparb et al. | 704/275 |
| 2003/0229593 | A1 | 12/2003 | Raley et al. | 705/55 |
| 2003/0233330 | A1 | 12/2003 | Raley et al. | 705/55 |
| 2004/0003389 | A1 | 1/2004 | Reynar et al. | 717/178 |
| 2004/0006741 | A1 | 1/2004 | Radja et al. | 715/513 |
| 2004/0103369 | A1* | 5/2004 | Robertson et al. | 715/513 |
| 2004/0165007 | A1 | 8/2004 | Shafron | 345/781 |
| 2004/0199861 | A1 | 10/2004 | Lucovsky | 715/500 |
| 2004/0236717 | A1 | 11/2004 | Demartini et al. | 707/1 |
| 2005/0050164 | A1 | 3/2005 | Burd et al. | 709/217 |
| 2005/0055330 | A1 | 3/2005 | Britton et al. | 707/1 |
| 2005/0120313 | A1 | 6/2005 | Rudd et al. | 715/866 |
| 2005/0187926 | A1 | 8/2005 | Britton et al. | 707/3 |

FOREIGN PATENT DOCUMENTS

| | | |
|---|---|---|
| EP | 0598511 A2 | 5/1994 |
| EP | 0810520 B1 | 12/1998 |
| EP | 1093058 A1 | 4/2001 |
| EP | 1280068 A2 | 1/2003 |
| EP | 1361523 A2 | 11/2003 |
| EP | 1376392 A2 | 1/2004 |
| WO | WO 95/07510 A1 | 3/1995 |
| WO | WO 99/17240 A1 | 4/1999 |
| WO | WO 01/18687 A1 | 3/2001 |
| WO | WO 01/37170 A2 | 5/2001 |
| WO | WO 01/86390 A2 | 11/2001 |
| WO | WO 02/99627 A1 | 1/2002 |
| WO | WO 02/15518 A2 | 2/2002 |

OTHER PUBLICATIONS

"Altova markup your mind!" http://web.archive.org/web/20021204211721/http://altova.com/products_ide.html, Dec. 2002, pp. 1-3.

Apple Data Detectors User's Manual, Apple Computer, Inc., 1997, pp. 1-15.

Arbortext, "Arbortext and Accessibility", http://web.archive.org/20021219133536/www.arbortext.com/html/accessiblity.html, Dec. 2002, pp. 1-5.

Arbortext, "Arbortext's Support for XSL-FO", http://web.archive.org/web/20021221021632/www.arbortext.com/html/xsl-fo.html. Dec. 2002, pp. 1-4.

Arbortext, "Schemas", http://web.archive.org/web/20021221023148/www.arbortext.com/html/schemas.html, Dec. 2002, pp. 1-3.

Arbortext, "XML Compliance, 100% Pure XML", http:web.archive.org/web/20021209185855/www.arbortext.com/html/xml_compliance, Dec. 2002, pp. 1-3.

Barrett, Rob, Paul P. Maglio and Daniel C. Kellem; How to personalize the Web; Conference proceedings on human factors in computing systems (1997) p. 75-82.

"Being 'Smart' with Smart Tags in Office XP", Create for Mississippi, Aug. 2001, http://www.create.cett.msstate.edu/create/howto/smart_tags.pdf, 7 pp.

Beitner, N.D.; Hall, W.; Goble, C.A., "Multimedia Support and Authoring in Microcosm: An Extended Model," Dept. of Electronics and Computer Science, Univ. of Southampton, Southampton SO17 1BJ, UK; Dept. of Computer Science, Univ. of Manchester, Oxford Road, Manchester MI3 9PL, UK, pp. 1-12, publication date unknown.

Bischof, Hans-Peter, "Spell, Spellin, Spellout—Finding Spelling Errors", http://www.vorlesungen.uni-osnabrueck.de/informatik/shellscript/Html/Man/_Man_NeXT_html/html..., Apr. 21, 1997, 2 pp.

"BizTalk Server 2002 Compiling Maps", http://msdn.microsoft.com/library/en-us/bts_2002/htm/lat_xmltools_map_concept_drgl.a..., Microsoft Corporation, 1999-2001, pp. 1.

"BizTalk Server 2002 Mapper User Interface", http://msdn.microsoft.com/library/en-us/bts_2002/htm/lat_xmltools_map_concept_codw..., Microsoft Corporation, 1999-2001, pp. 1.

"BizTalk Server 2002 Testing Maps", http://msdn.microsoft.com/library/en-us/bts_2002/htm/lat_xmltools_map_concept_fhhy.a..., Microsoft Corporation, 1999-2001, pp. 1-2.

"BizTalk Server 2002 View Links and Functoids By Using Grid Preview", http://msdn.microsoft.com/library/en-us/bts_2002/htm/lat_xmltools_map_check_fuwn.as..., Microsoft Corporation, 1999-2001, pp. 1.

Bonifati A., "Active Behaviors within XML Document Management", EDBT Ph. D. Workshop, Mar. 2000, pp. 1-4.

Boone, "Concept Features in Re: Agent, An Intelligent Email Agent", Proceedings of the 2nd Conference on Autonomous Agents, May 9-13, 1998, pp. 141-148.

Bosak, "XML: The Universal Publishing Format", SGML/XML Europe '98, May 1998, pp. A1-C17.

Braganholo V., "Updating Relational Databases Through XML Views", Technical Report, Sep. 2002, pp. 1-61.

Brockschmidt, K., "Inside OLE, Second Edition", 1995, Microsoft Press, p. 169.

Brooks-Bilson, "Programming ColdFusion" [electronic resource] 2001, Safari Tech Books Online, 1st Edition, 25 pp.

Ceri S. et al., "Deriving Production Rules for Incremental View Maintenance", Proceedings of the 17th International Conference on Very Large Data Bases, Sep. 1991, pp. 577-589.

"Chapter 8—Standard Input and Output", http://www.comp/lancs.ac.uk/computing/users/eiamjw/unix/chap8.html, 3 pp., publication date unknown.

Claris Em@iler Getting Started User's Guide, For Macintosh, Claris Corporation, 1995-1997, 61 pp.

Clark, James, and DeRose, Steve, "XML Path Language (XPath), Version 1.0", W3C, http://web.archive.org/web/2021010034434/http://www.w3.org/TR/xpath, 1999-2000, pp. 1-31.

Corel, "Corel XMetal 4 and Interwoven TeamXML", http://web.archive.org/20030807211225/www.corel.com/futuretense_cs/ccurl/corel+xml+4+and+interwoven+teamxml.pdf, Aug. 2003, pp. 1-2.

Corel, "Corel XMetal4, Making XML Content Creation Easy", http://web.archive.org/web/20031118215158/www.corel.com/servlet/Satellite?pagename, Nov. 2003, pp. 1-2.

Corel, "The Corel-XyEnterprise XML Solution", http://web.archive.org/web/20030807154355/www.corel.com/futuretense_cs/ccurl/corel+and+XY+enterprise+XML+solution.pdf, Aug. 2003, pp. 1-2.

Corel® Office Professional 7 Quick Results User's Manual, vol. 1, Version 7.0 (first printing), Corel Corporation, Limited, pp. 1-531, publication date unknown.

Cornell, Paul, "Developing Smart Tag DLLs", MSDN Library, http://msdn.microsoft.com/library/default.asp?url=/library/en-us/dnsmarttag/html/odc_smarttags.asp, Apr. 2001, pp. 8.

Desmarais, Michel C. and Jiming Liu; *Exploring the applications user-expertise assessment for intelligent interfaces*; Proceedings of the conference on human factors in computing systems, (1993) p. 308-313.

Devanbue, P. et al., "Chime: customizable hyperlink insertion and maintanance engine for software engineering environments", Software Engineering, Publication date: 1999, ISBN: 1-58113-07400.

Developer's Guide To Apple Data Detectors, For Version 1.0.2., Apple Computer, Inc., 1997, pp. 1-33.

Driza, Scott, "Learn Word 2000 VBA Document Automation", Wordware Publishing Inc., 2001, 6 pp.

Falquet G. et al., "Design and Analysis of Active Hypertext Views on Databases", Information Sciences Institute, Jan. 2002, pp. 1-24.

Fan et al., "FormPlus: A Form Authoring Toolkit", Proceedings of the Fourteenth Annual Computer Software and Applications Conference, Oct. 31, 1990-Nov. 2, 1990, pp. 255-260.

"Featuring Adobe® FrameMaker 6.0", Adobe Systems Incorporated, San Jose, CA, Apr. 2000, 4 pp.

Fernandez M. et al., "SilkRoute: trading between relations and XML", Computer Networks, vol. 33, No. 1-6, Jun. 2000, pp. 723-745.

Flanagan, D., "JavaScript—The Definitive Guide, Fourth Edition", Jan. 2002, O'Reilly, 12 pp.

Foley, James D.; *Future directions in user-computer interface software*; Conference proceedings on organizational computer systems, (1991) p. 289-297.

Foley, Jim; *Integrating computer technology, people technology; strategies and case studies from Georgia Tech's Graphics, Visualization and Usability Center*; Proceedings of the workshop on advanced visual interfaces, (1994) p. 34-43.

Ford, Bryan, Mike Hibler, Jay Lepreau, Roland McGrath and Patrick Tullman; *Interface and execution models in the fluke kernel*; Proceedings of the third symposium on operating systems design and implementation, (1999) p. 101-115.

Getting Results With Microsoft® Office 97, *Real World Solutions For The Work You Do*, Microsoft Corporation, 1995-1997, pp. 1-703.

Glushko, Robert J., Jay M. Tenenbaum and Bart Meltzer; *An XML framework for agent-based E-commerce*; Commun. ACM 42, 3 (Mar. 1999) p. 106.

Goschka, Karl M. and Jurgen Falb; *Dynamic hyperlink generation for navigation in relational databases*; Proceedings of the tenth ACM conference on hypertext and hypermedia: returning to our diverse roots (1999) p. 23-24.

"Handout 38: Spell Checking, Word Counting, and Textual Analysis", http://courses.cs.emporia.edu/pheattch/courses/2002/cs501s02/hand38/, 3 pp., publication date unknown.

Harold, E.R., "XML: Extensible Markup Language", IDG Books Worldwide, Books 24x7.com printout, 1998, 20 pp.

Hartson, H. Rex and Deborah Hix; *Human-computer interface development: concepts and systems for its management*; ACM Comput. Surv. 1 (Mar. 1989) p. 5-92.

Hewkin, "Smart Tags-the Distributed-Memory Resolution", IEE Review, Jun. 22, 1989, pp. 203-206.

Horner, Alex et al., Professional Active Services Pages, 1997, Wrox Press Ltd., Section"Client-Side Scripting and Components", subsection "Choosing Your Applets, and Controls", 16 pp.

"How to Use XSL to Transform Excel XML Spreadsheet for Server-Side Use", http://support.microsoft.com/default.aspx?scid=kb;en-us;278976, Microsoft Corporation, Aug. 2004, pp. 1-7.

IBM Corporation, "IBM Research Disclosure #368; Multimedia Hyperlinks Automatically Created For Reference Documents," *IBM Technical Disclosure* Bulletin, Jun. 1993, pp. 1-5.

IBM Technical Disclosure Bulletin, "National Language Support Enhancement for Culture-Specific Operations", Nov. 1, 1993, vol. 36, Issue 11, pp. 629-638.

*InfoCentral™ 7*, User's Manual, Corel Corporation, vol. 1, Version 7.0, 1996, pp. 1-86.

"InfoPath: Microsoft Names New Product from Office Group", http://www.microsoft.com/presspass/press/2003/feb03/02-10infopath.mspx, Microsoft Corporation, Oct. 2002-Feb. 2003, pp. 1-4.

"Integrated Development Enviorment (IDE)", http://web.archive.org/web/20020602032242/http://altova.com/products_ide.html, Jun. 2002, pp. 1-2.

"Integrating with External Systems: iPlanet™ Unified Development Server", Sun Microsystems, Inc., Ver. 5.0, Aug. 2001, pp. 127-156.

"Intelligent Text Processing: About", http://www.syntalex.co.uk/about.html, download date: Aug. 7, 1999, 1 pp.

"Intelligent Text Processing: Automatic Cross-Referencing", http://www.syntalex.co.uk/services/acrl.html, download date Aug. 7, 1999, 3 pp.

"Intelligent Text Processing: Case Study: Context", http://www.syntalex.co.uk/casestudies/context.html, downloand date: Aug. 7, 1999, 3 pp.

Ispell 4, "Ispell—Format of Ispell Dictionaries and Affix Files", http://www.bigbiz.com/cgi-bin/manpage?4+ispell, 11 pp., publication date unknown.

Kristensen, "Template Resolution in XML/HTML", Computer Networks and ISDN Systems, vol. 30, 1998, pp. 239-249.

Kuenning, Geoff, "International Spell", http://fmg-www.cs.ucla.edu/geoff.ispell.html, 3 pp., publication date unknown.

Kuenning, Geoff, "Using ISPELL from Emacs", http://theochem.ki.ku.dk/on_line_docs/ispell/ispell_1.html, 4 pp., publication date unknown.

Kukich, Karen; *Technique for Automatically Correcting Words in Text*; ACM Comput. Surv., 24, 4 (Dec. 1992); pp. 377-439.

Marais, Hannes, "Supporting Cooperative and Personal Surfing With a Desktop Assistant", 1997, ACM Press, pp. 129-138.

Martensson, Bengt, "Thread-Enhanced Spell Front End for GNU Emacs+Detex+Delatex", http://www.geocrawler.com/archives/3/337/1987/8/0/1871981/, Aug. 20, 1987, 1 page.

Marx, Matt and Chris Schmandt; *Putting People First: Specifying Proper Names in Speech Interfaces*; Proceedings of the ACM Symposium on User Interface Software and Technology; 1994; pp. 29-37.

Marx, Matthew and Chris Schmandt; *CLUES: dynamic personalized message filtering*; Proceedings of the ACM 1996 conference on computed supported cooperative work (1996) p. 113-121.

McMahon, Lee. E., "SED—A Non-Interactive Text Editor," Bell Laboratories, Murray Hill, New Jersey 07974, Aug. 15, 1978, pp. 16.

Measuring Units Conversion Table—http://web.archie.org- 1997 Internet French Property, pp. 1-4.

Menu Customizing, IBM Technical Disclosure Bulletin, vol. 34, No. 1, Jun. 1991, pp. 91-92 (4 pp. total).

"Microsoft BizTalk Server 2002—Using BizTalk Mapper", http://msdn.Microsoft.com/library/en-us/bts_2002/htm/lat_xmltools_map_intro_zkqb.asp..., Microsoft Corporation, 1999-2001, pp. 1-2.

*Microsoft Computer Dictionary*, Microsoft, Microsoft Press, Fifth Edition, p. 409.

"Microsoft Extends XML Web Services Support in .NET Enterprise Servers Through Visual Studio .NET", http://www.microsoft.com/presspass/press/2002/feb02/02-13servervspr.mspx, Microsoft Corporation, Feb. 2002, pp. 1-3.

"Microsoft Unveils Visual Studio.NET Enterprise Tools", Microsoft Corporation, http://microsoft.com/presspass/press/2001/may01/05-21vseepr.mspx, May 2001, pp. 1-4.

"Module 123—Spell", http://duplex.hypermart.net/books/bsd/501-504.html, 4 pp., publication date unknown.

Mueller, Jennifer M., "Work Smarter with Smart Tags", Journal of Accounting—Online, vol. 194, No. 5, Nov. 2002, http://www.aicpa.org/pubs/jofa/nov2002/Mueller.htm>, retrieved on Apr. 22, 2005.

Nardi, Bonnie A.; Miller, James R.; Wright, David J., "Collaborative, Programmable Intelligent Agents," Jim Miller/Miramontes Computing, Apple Computer Advanced Technology Group, http://www.miramontes.com/writing/add-cacm/add-cacm/html, Mar. 1998, pp. 1-11.

"New Microsoft Office Family Application Taps of Power of Industry-Standard XML", http://www.microsoft.com/presspass/press/2002/oct02/10-09officefamilypr.mspx, Microsoft Corporation, Oct. 2002-Feb. 2003, pp. 1-2.

Novell GroupWise User's Guide for Windows 16-Bit Version 5.2, Novell, Inc., 1993-1997, pp. 1-231.

Novell GroupWise User's Guide for Windows 32-Bit Version 5.2, Novell, Inc., 1998, pp. 1-318.

Panagiotis, Christias, Man-cgi 1.15, http://www.calpoly.edu/cgi-bin/man-cgi?spell+1, 1994, 3 pp.

Panagiotis, Christias, Man-cgi 1.15, http://www.physics.umn.edu/cgi-bin/man-cgi?spell, 1994, 5 pp.

Pentland, Alex; *Perceptual user interfaces; perceptual intelligence*; Commun. ACM 43, 3 (Mar. 2000) p. 35-44.

Perry, Brad, et al., "Discovering Similar Resources by Content Park-Linking", Proceedings of the Sixth International Conference on Information and Knowledge Management, published by ACM Press 1997, pp. 317-324.

"Q&A: How 'XDocs' Alters the Paradigm for Gathering Business-Critical Information", http://www.microsoft.com/presspass/press/2002/oct02/10-09officefamily.mspx, Microsoft Corporation, Oct. 2002-Feb. 2003, pp. 1-4.

Quin, Liam, "Extensible Markup Language (XML)", W3C Architecture Domain, http://web.archive.org/web/2002121962057/http://www.w3.org/XML/, 1996-2002, pp. 1-3.

Santos, C.A.S., L.F.G Soares, G.L. de Souza and J.P. Courtiat; *Design methodology and formal validation of hypermedia documents*; Proceedings of the sixth ACM international conference on multimedia, (1998) p. 39-48.

Schulz, Charles, "Writing Applications for Uniform Operation on a Mainframe or PC: A Metric Conversion Program", Lockheed Missles & Space Company, Inc., Sunnyvale, CA, May 1990, pp. 348-361.

"Smart Tags: Dumb Technology?", webreference.com, Online, Aug. 29, 2001, http://www.webreference.com/xml/column30/3.html, 3 pp.

"Spellout Command", Commands Reference, vol. 5, http://www.rz.uni-hohenheim.de/betriebssysteme/unix/aix/aix_4.3.3_doc/base_doc/usr/share/man/inf..., 1 page, publication date unknown.

Sperberg-McQueen, C.M. and Thompson, Henry, "XML Schema", W3C Architecture Domain, http://web.archive.org/web/20020802155904/http://www.w3.org/XML/Schema, 2000-2002, pp. 1-10.

Sriram, V., "ComponentXchange: An E-Exchange for Software Components", Master Thesis, CitSeer, May 2001, pp. i-v, 1-77.

Stairmand, Mark A.; *Textual context analysis for information retrieval*; Proceedings of the 20th annual international ACM SIGIR conference on research and development in information retrieval (1997) p. 140-147.

Takkinen et al., "CAFÉ: A Conceptual Model for Managing Information in Electronic Mail", Proceedings of the Annual Hawaii International Conference on System Sciences, 1998, pp. 44-53.

Terveen, Loren, Will Hill and Brian Amento; *Constructing, organizing, and visualizing collections of tropically related Web resources*; ACM Trans. Comput.-um. Interact. 6, 1 (Mar. 1999) p. 67-94.

*The Complete LINUX™ Operating System 5.2 Deluxe*, Red Hat, ® Macmillian Digital Publishing USA, A Viacom Company, Red Hat Software, Inc., ISBN 1-57595-199-1B, 1995-1998, pp. 1-385.

"The StarOffice™ 6.0 Suite: New Features Guide", Sun Microsystems, V. 1.1, Jul. 2002, pp. 1-31.

Toth, V., "Visual C++ 4 Unleashed", 1996, Sams Publishing, p. 174.

Towers, J. Tarin, Visual Quickstart Guide: Dreamweaver 2 for Windows and Macintosh, 1999, Peachpit Press, pp. 150-151.

Tsai, M., P. Reiher and G.J. Popek; *Command management system for next-generation user input*; Proceedings of the seventh workshop on hottopics systems, (1999) p. 179-84.

*User Manual For AddressMate and AddressMate Plus*, CoStar Corporation, AddressMate Software, 1994-1995, pp. 1-210.

"Using Flyswat", http://www.flyswat.com/using.html, download date: Sep. 28, 1999, 1 pp.

"What is Flyswat", http://www.flyswat.com, download date: Sep. 28, 1999, 5 pp.

Wilker, John, "ColdFusion MX Adds J2EE, XML, and Web Services Compatibility", Aug. 9, 2002, http://builder.com.com/5102-6387-104585.html, 3 pp.

Willison, Pace, Ispell (1), "User Commands", http://www.csee.usf.edu/cgi-bin/man-cgi?ispell, 1983, 18 pp.

Willison, Pace, Ispell (1), http://www.rt.com/man/findaffix.1.html, 1983, 15 pp.

Armstrong et al., "The Java Web Services Tutorial", published Feb. 4, 2002 by Sun Microsystems, Inc., pp. 1-84 and 329-366.

Kuramitsu et al., "Distributed object-oriented schema for XML-based Electronic Catalog Sharing Semantics among Businesses", Web Information Systems Engineering, 2000, published Jun. 2000, IEEE, pp. 87-96.

Fordin, "Java Architecture for XML Binding: Executive Summary", Sun Microsystems, Jul. 2003, pp. 1-7.

Microsoft Computer Dictionary, 5$^{th}$ Ed., copyright 2002, Microsoft Press, pp. 33 and 372.

Skonnard, "What's New in MSXML 4.0", MSDN Magazine, Dec. 2001, pp. 1-12, msdn.microsoft.com/msdnmag/issues/01/12/xml.

Sosnoski, "XML and Java technologies: Document models, Part 1: Performance", IBM DeveloperWorks, Sep. 1, 2001, pp. 1-13, www-128.ibm.com/developerworks/xml/library/x-injava/.

Schloss et al., "XML Schema Infoset API Requirements", IBM Working Draft, Feb. 15, 2002, pp. 1-14.

Obasanjo, "W3C XML Schema Design Patterns: Dealing With Change", XML.com Article, Jul. 3, 2002, pp. 1-12.

McQueen, "Re: using namespaces to version", Altova Mailing List Archives, May 4, 2001, pp. 1-2.

\* cited by examiner

PROGRAMMABLE OBJECT MODEL FOR EXTENSIBLE MARKUP LANGUAGE SCHEMA VALIDATION

RELATED APPLICATIONS

U.S. Utility patent application Ser. No. 10/731,634, entitled "Programmable Object Model for Extensible Markup Language Markup in an Application," and U.S. Utility patent application Ser. No. 10/731,597, entitled "Programmable Object Model for Namespace or Schema Library Support in a Software Application," both of which were filed on Dec. 9, 2003, and are currently pending, are hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

FIELD OF THE INVENTION

The present invention relates generally to programmable object models. More particularly, the present invention relates to a programmable object model for Extensible Markup Language (XML) schema validation.

BACKGROUND OF THE INVENTION

Computer software applications allow users to create a variety of documents to assist them in work, education, and leisure. For example, popular word processing applications allow users to create letters, articles, books, memoranda, and the like. Spreadsheet applications allow users to store, manipulate, print, and display a variety of alphanumeric data. Such applications have a number of well known strengths including rich editing, formatting, printing, calculation and on-line and off-line editing.

Most computer software applications do not contain all necessary programming for providing functionality required or desired by every potential user. Many programmers often wish to take advantage of an existing application's capabilities in their own programs or to customize the functionality of an application and make it more suitable for a specific set of users or actions. For example, a programmer working in the financial industry may wish to customize a word processor for a user audience consisting of financial analysts editing financial reports. In recent years, the Extensible Markup Language has been used widely as an interchangeable data format for many users. A word processor, spreadsheet application or other application capable of validating Extensible Markup Language (XML) data against an attached or associated XML schema file provides value to its users. However, because the functionality of the schema validation model of the application is not exposed to the programmer, the programmer is not able to customize or modify the schema validation model to work with the programmer's own customized versions of the application or documents prepared by the application.

Accordingly, there is a need in the art for a programmable object model for allowing users/programmers to programmatically access, supplement or otherwise modify an application's XML validation functionality. It is with respect to these and other considerations that the present invention has been made.

SUMMARY OF THE INVENTION

The present invention provides methods and systems for allowing a user to access programmatically the schema validation model of an application via a programmable object model. The programmable object model includes a plurality of object-oriented message calls or application programming interfaces for allowing a user to programmatically access the schema validation model of an application by sending message calls and required parameters to the schema validation model in order to customize or otherwise modify the operation of the schema validation model as desired by the user. Once the user has access to the schema validation model of a given application, the user may attach Extensible Markup Language (XML) schema files to a document and control definitions, grammatical rules, and other settings dictated by the attached XML schema file. Accessing the schema validation model of a given application also allows the user to customize the application's native schema validation functionality with user-defined rules and error text. According to aspects of the invention, the XML schema validation model of a given application may be accessed by the user from a user-created program written according to a variety of different languages such as C, C++, C#, Visual Basic and the like.

These and other features, advantages, and aspects of the present invention may be more clearly understood and appreciated from a review of the following detailed description of the disclosed embodiments and by reference to the appended drawings and claims.

DETAILED DESCRIPTION OF THE PREFERRED EMBODIMENT

Embodiments of the present invention are directed to methods and systems for allowing a user to programmatically call a native schema validation model of a software application for customizing, utilizing, and otherwise manipulating objects and properties of the native schema validation model for allowing the user to attach one or more desired XML schemas to a document and for controlling one or more objects or properties of those attached XML schema files as applied to a document to which the one or more schema files are attached. Embodiments of the present invention also allow a user to programmatically customize a native schema validation model with user-defined rules and error text. In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting senses and the scope of the present invention is defined by the appended claims and their equivalents.

Figure 1:
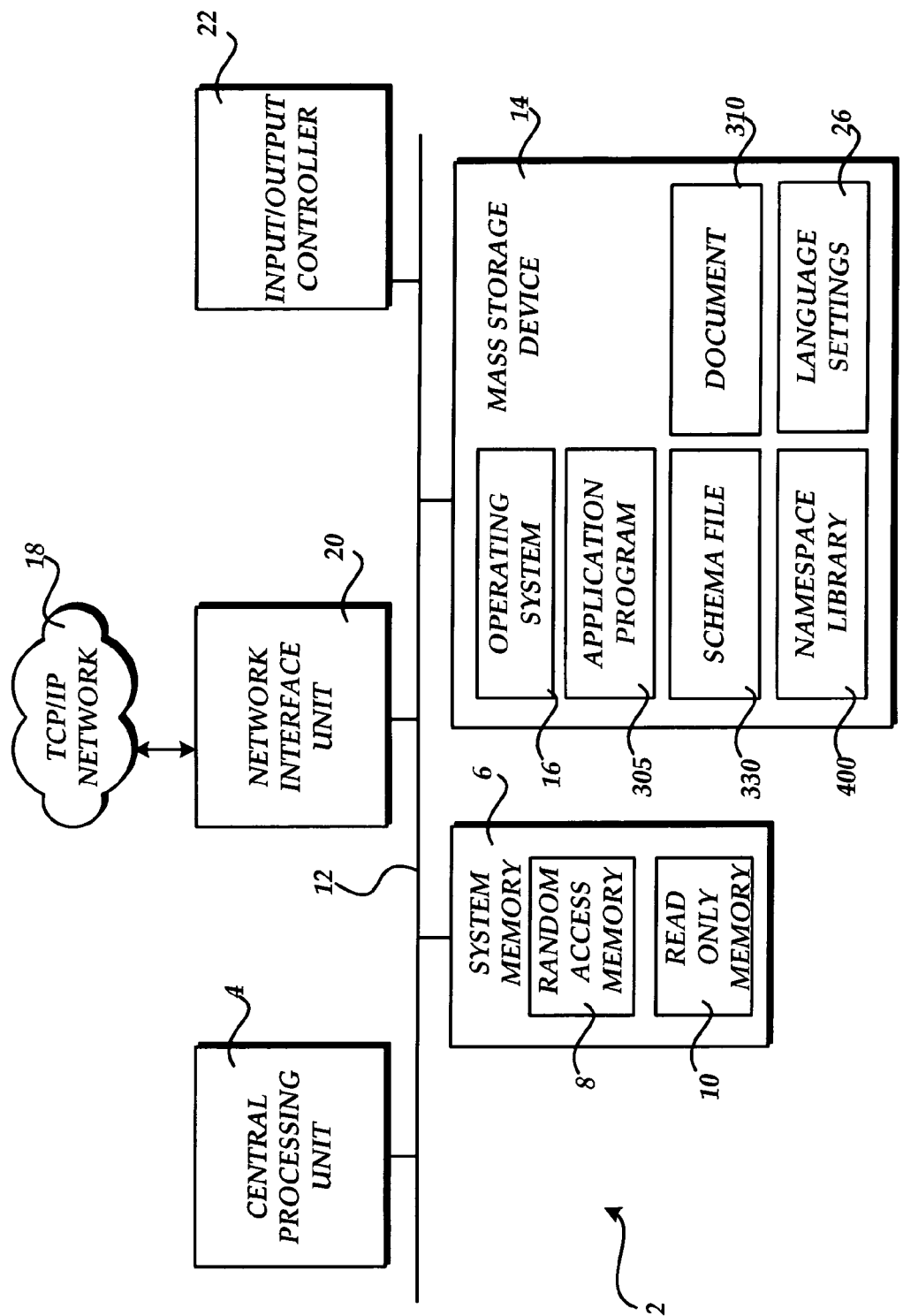
FIG. 1 is a simplified block diagram of a computing system and associated peripherals and network devices that provide an exemplary operating environment for the present invention.

Referring now to the drawings, in which like numerals represent like elements through the several figures, aspects of the present invention and the exemplary operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for a personal computer 2 for practicing the various embodiments of the invention will be described. The computer architecture shown in FIG. 1 illustrates a conventional personal computer, including a central processing unit 4 ("CPU"), a system memory 6, including a random access memory 8 ("RAM") and a read-only memory ("ROM") 10, and a system bus 12 that couples the memory to the CPU 4. A basic input/output system containing the basic routines that help to transfer information between elements within the computer, such as during startup, is stored in the ROM 10. The personal computer 2 further includes a mass storage device 14 for storing an operating system 16, application programs, such as the application program 305, and data.

The mass storage device 14 is connected to the CPU 4 through a mass storage controller (not shown) connected to the bus 12. The mass storage device 14 and its associated computer-readable media, provide non-volatile storage for the personal computer 2. Although the description of computer-readable media contained herein refers to a mass storage device, such as a hard disk or CD-ROM drive, it should be appreciated by those skilled in the art that computer-readable media can be any available media that can be accessed by the personal computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the personal computer 2 may operate in a networked environment using logical connections to remote computers through a TCP/IP network 18, such as the Internet. The personal computer 2 may connect to the TCP/IP network 18 through a network interface unit 20 connected to the bus 12. It should be appreciated that the network interface unit 20 may also be utilized to connect to other types of networks and remote computer systems. The personal computer 2 may also include an input/output controller 22 for receiving and processing input from a number of devices, including a keyboard or mouse (not shown). Similarly, an input/output controller 22 may provide output to a display screen, a printer, or other type of output device.

As mentioned briefly above, a number of program modules and data files may be stored in the mass storage device 14 and RAM 8 of the personal computer 2, including an operating system 16 suitable for controlling the operation of a networked personal computer, such as the WINDOWS XP operating system from MICROSOFT CORPORATION of Redmond, Wash. The mass storage device 14 and RAM 8 may also store one or more application programs. In particular, the mass storage device 14 and RAM 8 may store an application program 305 for creating and editing an electronic document 310. For instance, the application program 305 may comprise a word processing application program, a spreadsheet application, a contact application, and the like. Application programs for creating and editing other types of electronic documents may also be used with the various embodiments of the present invention. A schema file 330 and a namespace/schema library 400, described below, are also shown.

Figure 2:
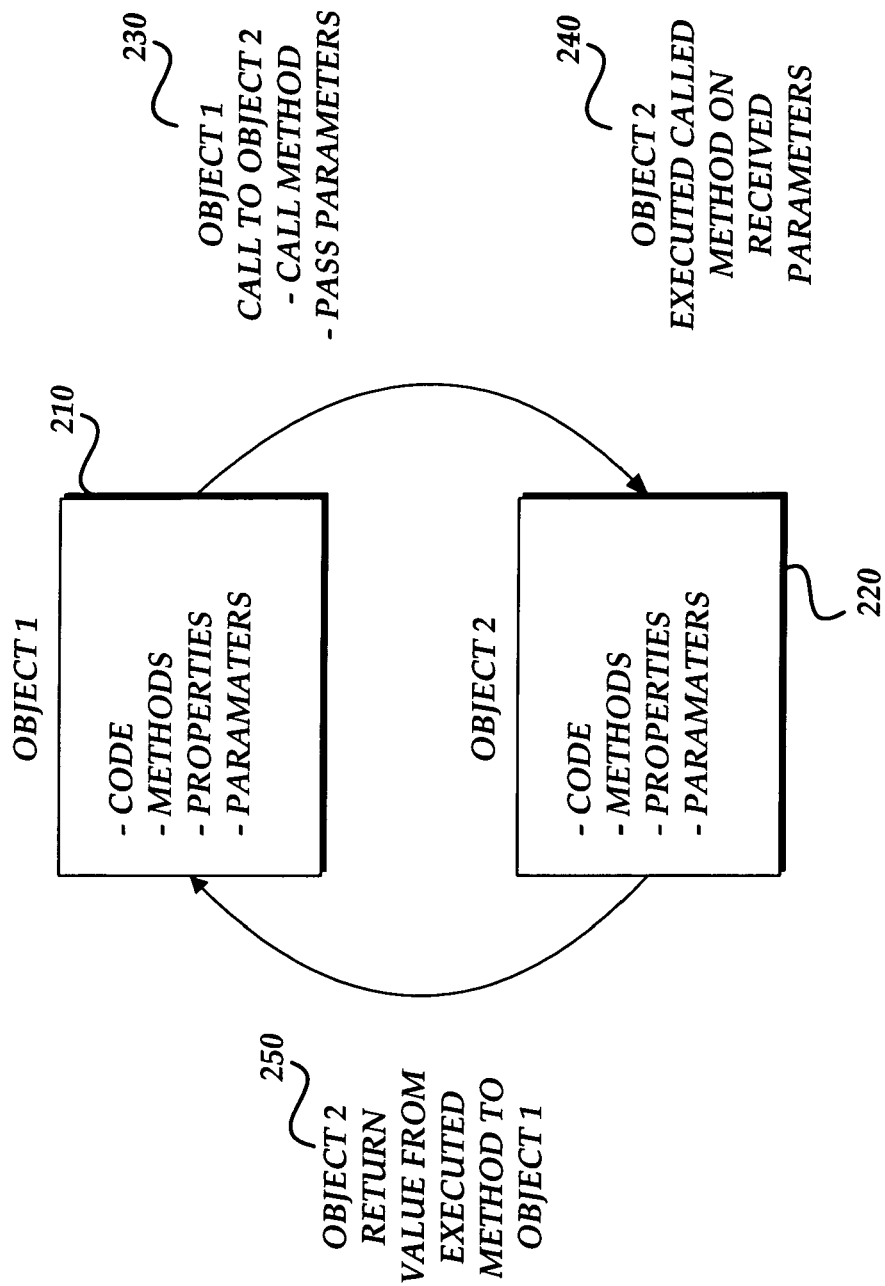
FIG. 2 is a simplified block diagram illustrating interaction between software objects according to an object-oriented programming model.

Exemplary embodiments of the present invention are implemented by communications between different software objects in an object-oriented programming environment. For purposes of the following description of embodiments of the present invention, it is useful to briefly to describe components of an object-oriented programming environment. FIG. 2 is a simplified block diagram illustrating interaction between software objects according to an object-oriented programming model. According to an object-oriented programming environment, a first object 210 may include software code, executable methods, properties, and parameters. Similarly, a second object 220 may also include software code, executable methods, properties, and parameters.

A first object 210 may communicate with a second object 220 to obtain information or functionality from the second object 220 by calling the second object 220 via a message call 230. As is well know to those skilled in the art of object-oriented programming environment, the first object 210 may communicate with the second object 220 via application programming interfaces (API) that allow two disparate software objects 210, 220 to communicate with each other in order to obtain information and functionality from each other. For example, if the first object 210 requires the functionality provided by a method contained in the second object 220, the first object 210 may pass a message call 230 to the second object 220 in which the first object identifies the required method and in which the first object passes any required parameters to the second object required by the second object for operating the identified method. Once the second object 220 receives the call from the first object, the second object executes the called method based on the provided parameters and sends a return message 250 containing a value obtained from the executed method back to the first object 210.

For example, in terms of embodiments of the present invention, and as will be described below, a first object 210 may be a third party customized application that passes a message to a second object such as an Extensible Markup Language schema validation object whereby the first object identifies a method requiring the validation of a specified XML element in a document where the specified XML element is a parameter passed by the first object with the identified method. Upon receipt of the call from the first object, according to this example, the schema validation object executes the identified method on the specified XML element and returns a message to the first object in the form of a result or value associated with the validated XML element. Operation of object-oriented programming environments, as briefly described above, are well known to those skilled in the art.

Figure 3:
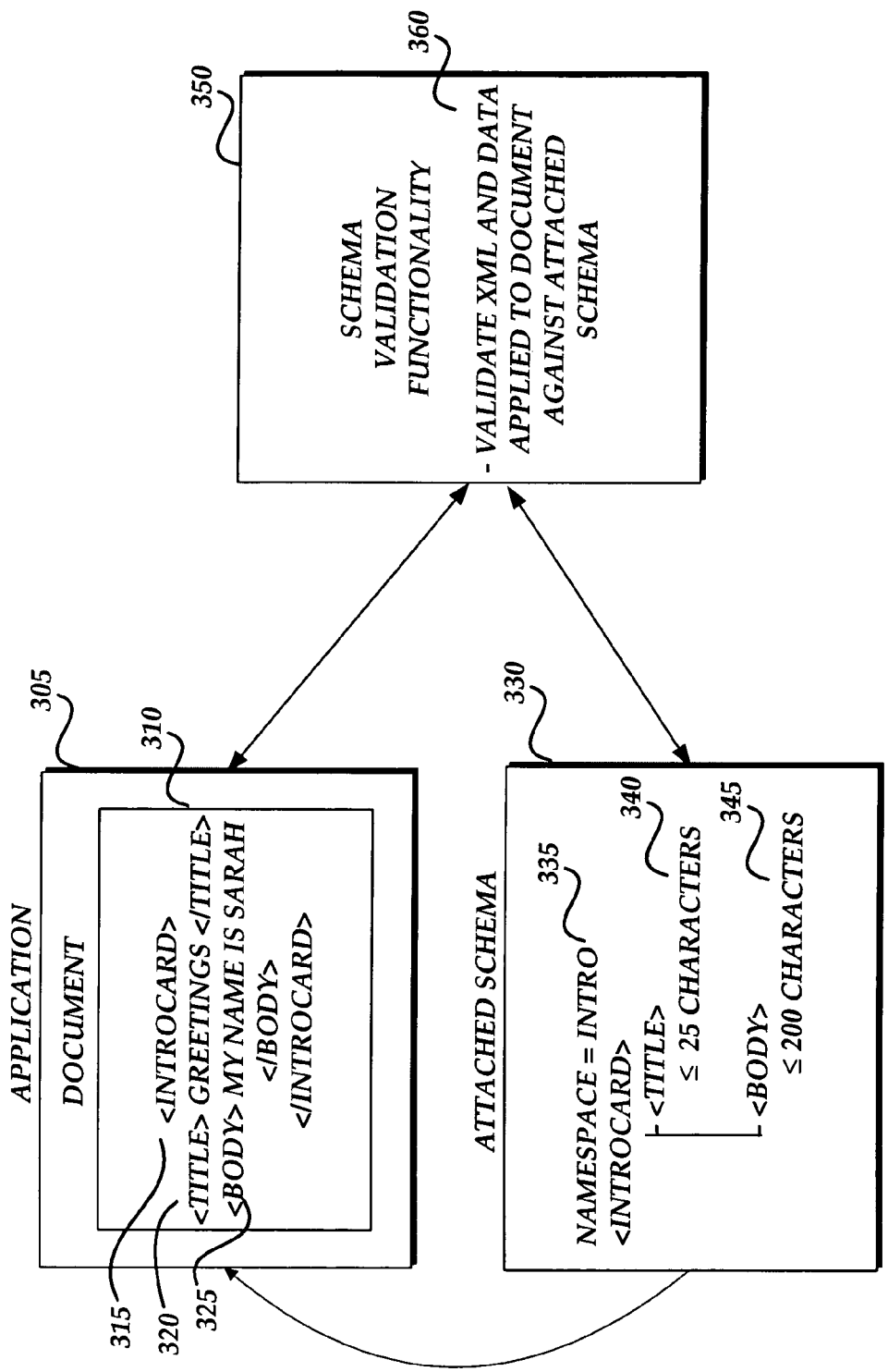
FIG. 3 is a block diagram illustrating interaction between a document, an attached schema file, and a schema validation functionality model.

As described below, embodiments of the present invention are implemented through the interaction of software objects in the use, customization, and application of components of the Extensible Markup Language (XML). FIG. 3 is a block diagram illustrating interaction between a document, an attached schema file, and a schema validation functionality module. As is well known to those skilled in the art, the Extensible Markup Language (XML) provides a method of describing text and data in a document by allowing a user to create tag names that are applied to text or data in a document that in turn define the text or data to which associated tags are applied. For example referring to FIG. 3, the document 310 created with the application 305 contains text that has been marked up with XML tags 315, 320, 325. For example, the text "Greetings" is annotated with the XML tag <title>. The text "My name is Sarah" is annotated with the <body> tag. According to XML, the creator of the <title> and <body> tags is free to create her own tags for describing the tags to which those tags will be applied. Then, so long as any downstream consuming application or computing machine is provided instructions as to the definition of the tags applied to the text, that application or computing machine may utilize the data in accordance with the tags. For example, if a downstream application has been programmed to extract text defined as titles of articles or publications processed by that application, the application may parse the document 310 and extract the text "Greetings," as illustrated in FIG. 3 because that text is annotated with the tag <title>. The creator of the particular XML tag naming for the document 310, illustrated in FIG. 3, provides useful description for text or data contained in the document 310 that may be utilized by third parties so long as those third parties are provided with the definitions associated with tags applied to the text or data.

According to embodiments of the present invention, the text and XML markup entered into the document 310 may be saved according to a variety of different file formats and according to the native programming language of the application 305 with which the document 310 is created. For example, the text and XML markup may be saved according to a word processing application, a spreadsheet application, and the like. Alternatively, the text and XML markup entered into the document 310 may be saved as an XML format whereby the text or data, any applied XML markup, and any formatting such as font, style, paragraph structure, etc. may be saved as an XML representation. Accordingly, downstream or third party applications capable of understanding data saved as XML may open and consume the text or data thus saved as an XML representation. For a detailed discussion of saving text and XML markup and associated formatting and other attributes of a document 310 as XML, see U.S. patent application entitled "Word Processing Document Stored in a Single XML File that may be Manipulated by Applications that Understanding XML," U.S. Ser. No. 10/187,060, filed Jun. 28, 2002, which is incorporated herein by reference as if fully set out herein.

In order to provide a definitional framework for XML markup elements (tags) applied to text or data, as illustrated in FIG. 3, XML schema files are created which contain information necessary for allowing users and consumers of marked up and stored data to understand the XML tagging definitions designed by the creator of the document. Each schema file also referred to in the art as a Namespace or XSD file preferably includes a listing of all XML elements (tags) that may be applied to a document according to a given schema file. For example, a schema file 330, illustrated in FIG. 3, may be a schema file containing definitions of certain XML elements that may be applied to a document 310 including attributes of XML elements or limitations and/or rules associated with text or data that may be annotated with XML elements according to the schema file. For example, referring to the schema file 330 illustrated in FIG. 3, the schema file is identified by the Namespace "intro" the schema file includes a root element of <intro card>.

According to the schema file 330, the <intro card> element serves as a root element for the schema file and also as a parent element to two child elements <title> and <body>. As is well known to those skilled in the art, a number of parent elements may be defined under a single root element, and a number of child elements may be defined under each parent element. Typically, however, a given schema file 330 contains only one root element. Referring still to FIG. 3, the schema file 330 also contains attributes 340 and 345 to the <title> and <body> elements, respectfully. The attributes 340 and 345 may provide further definition or rules associated with applying the respective elements to text or data in the document 310. For example, the attribute 345 defines that text annotated with the <title> element must be less than or equal to twenty-five characters in length. Accordingly, if text exceeding twenty-five characters in length is annotated with the <title> element or tag, the attempted annotation of that text will be invalid according to the definitions contained in the schema file 330.

By applying such definitions or rules as attributes to XML elements, the creator of the schema may dictate the structure of data contained in a document associated with a given schema file. For example, if the creator of a schema file 330 for defining XML markup applied to a resume document desires that the experience section of the resume document contain no more than four present or previous job entries, the creator of the schema file 330 may define an attribute of an <experience> element, for example, to allow that no more than four present or past job entries may be entered between the <experience> tags in order for the experience text to be valid according to the schema file 330. As is well known to those skilled in the art, the schema file 330 may be attached to or otherwise associated with a given document 310 for application of allowable XML markup defined in the attached schema file to the document 310. According to one embodiment, the document 310 marked up with XML elements of the attached or associated schema file 330 may point to the attached or associated schema file by pointing to a uniform resource identifier (URI) associated with a Namespace identifying the attached or associated schema file 330.

According to embodiments of the present invention, a document 310 may have a plurality of attached schema files. That is, a creator of the document 310 may associate or attach more than one schema file 330 to the document 310 in order to provide a framework for the annotation of XML markup from more than one schema file. For example, a document 310 may contain text or data associated with financial data. A creator of the document 310 may wish to associate XML schema files 330 containing XML markup and definitions associated with multiple financial institutions. Accordingly, the creator of the document 310 may associate an XML schema file 330 from one or more financial institutions with the document 310. Likewise, a given XML schema file 330 may be associated with a particular document structure such as a template for placing financial data into a desirable format.

According to embodiments of the present invention, a collection of XML schema files and associated document solutions may be maintained in a Namespace or schema library located separately from the document 310. The document 310 may in turn contain pointers to URIs in the Namespace or schema library associated with the one or more schema files attached to otherwise associated with the document 310. As the document 310 requires information from one or more associated schema files, the document 310 points to the Namespace or schema library to obtain the required schema definitions. For a detailed description of the use of an operation of Namespace or schema libraries, see U.S. patent application entitled "System and Method for Providing Namespace Related Information," U.S. Ser. No. 10/184,190, filed Jun. 27, 2002, and U.S. patent application entitled "System and Method for Obtaining and Using Namespace Related Information for Opening XML Documents," U.S. Ser. No. 10/185,940, filed Jun. 27, 2002, both U.S. patent applications of which are incorporated herein by reference as if fully set out herein. For a detailed description of a mechanism for downloading software components such as XML schema files and associated solutions from a Namespace or schema library, see US patent application entitled Mechanism for Downloading Software Components from a Remote Source for Use by a Local Software Application, U.S. Ser. No. 10/164,260, filed Jun. 5, 2002.

Referring still to FIG. 3, a schema validation functionality module 350 is illustrated for validating XML markup applied to a document 310 against an XML schema file 330 attached to or otherwise associated with the document 310, as described above. As described above, the schema file 330 sets out acceptable XML elements and associated attributes and defines rules for the valid annotation of the document 310 with XML markup from an associated schema file 330. For example, as shown in the schema file 330, two child elements <title> and <body> are defined under the root or parent element <intro card>. Attributes 340, 345 defining the acceptable string length of text associated with the child elements <title> and <body> are also illustrated. As described above, if a user attempts to annotate the document 310 with XML markup from a schema file 330 attached to or associated with the document in violation of the XML markup definitions contained in the schema file 330, an invalidity or error state will be presented. For example, if the user attempts to enter a title string exceeding twenty-five characters, that text entry will violate the maximum character length attribute of the <title> element of the schema file 330. In order to validate XML markup applied to a document 310, against an associated schema file 330, a schema validation module 350 is utilized. As should be understood by those skilled in the art, the schema validation module 350 is a software module including computer executable instructions sufficient for comparing XML markup and associated text entered in to a document 310 against an associated or attached XML schema file 330 as the XML markup and associated text is entered in to the document 310.

According to embodiments of the present invention, the schema validation module 350 compares each XML markup element and associated text or data applied to the document 310 against the attached or associated schema file 330 to determine whether each element and associated text or data complies with the rules and definitions set out by the attached schema file 330. For example, if a user attempts to enter a character string exceeding twenty-five characters annotated by the <title> elements 320, the schema validation module will compare that text string against the text string attribute 340 of the attached schema file 330 and determine that the text string entered by the user exceeds the maximum allowable text string length. Accordingly, an error message or dialogue will be presented to the user to alert the user that the text string being entered by the user exceeds the maximum allowable character length according to the attached schema file 330. Likewise, if the user attempts to add an XML markup element between the <title> and the <body> elements, the schema validation module 350 will determine that the XML markup element applied by the user is not a valid element allowed between the <title> and <body> elements according to the attached schema file 330. Accordingly, the schema validation module 350 will generate an error message or dialogue to the user to alert the user of the invalid XML markup.

Programmable Object Model for XML Schema Validation

Figure 4:
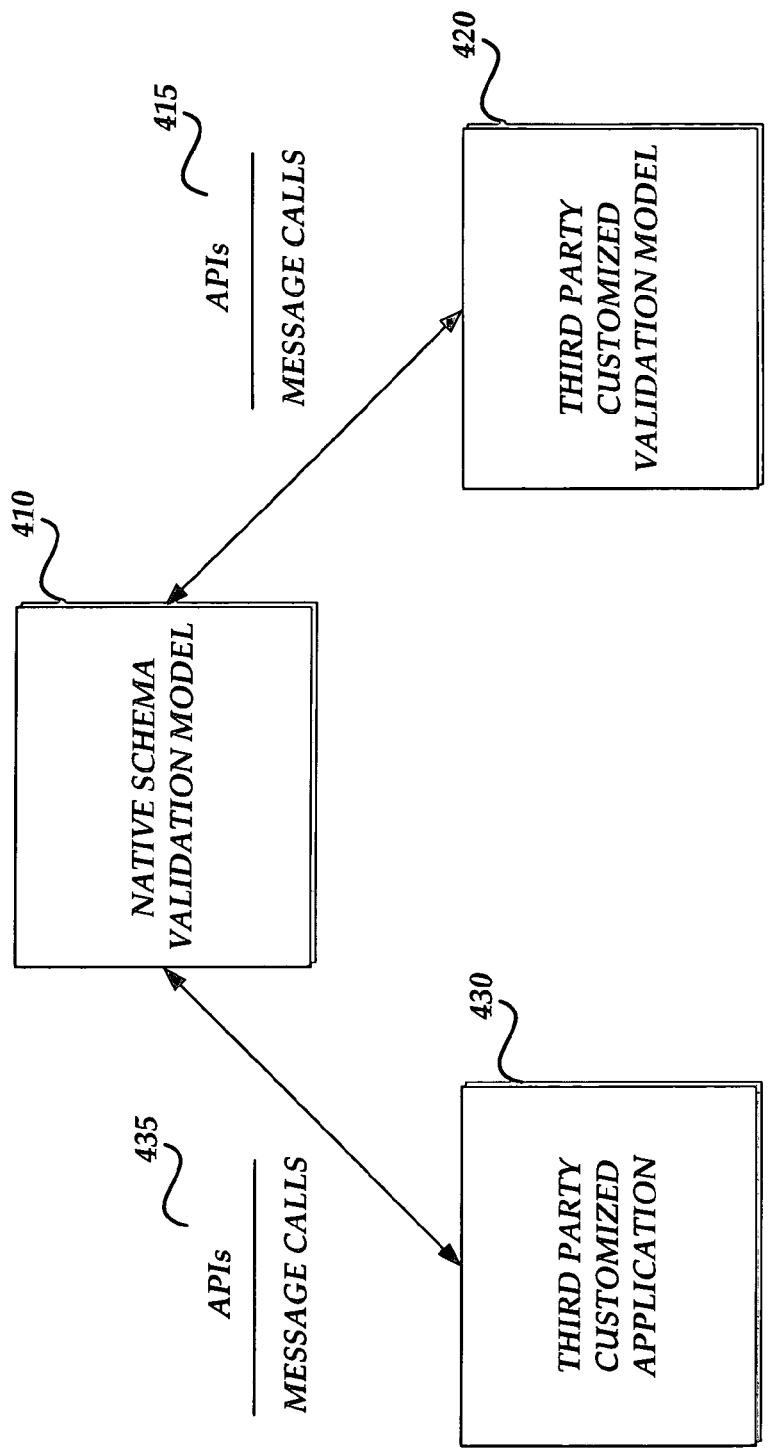
FIG. 4 is a block diagram illustrating interaction between a third party customized application, a third party customized schema validation model and a native schema validation model.

FIG. 4 is a block diagram illustrating interaction between a third party customized application, a third party customized schema validation model and a native schema validation model. According to embodiments of the present invention, an object-oriented programming model is provided for exposing to a user the native XML schema validation functionality of a given software application 305 to allow the user to programmatically call the schema validation functionality via a set of application programming interfaces or object-oriented message calls either directly through one or more application programming interfaces or programmatically through other software application programs written according to a variety of programming languages, for example C, C++, C#, Visual Basic, and the like.

With access to the native schema validation functionality of an application 305, the user may manually or programmatically attach one or more XML schema files 330 to a document 310 and subsequently control components of those XML schema files including individual components, objects or properties thereof. Additionally, access to the schema validation functionality of a given application 305 allows a user to customize the application's native schema validation functionality with user-defined rules and error text. For example, as described above with reference to FIG. 3, if according to a given XML schema file 330 an error is produced if a user attempts to add a text string in excess of that allowed by the schema definitions for a given XML markup element, an error message may be presented to the user upon validation of the user's text entry against the schema file 330. According to embodiments of the present invention, by allowing the user access to the native schema validation functionality of the application 305 with which the document 310 is created, the user may customize the schema validation functionality to allow the text string in excess of the maximum character length, or the user may customize the validation functionality to present a personalized or customized error message in place of the error message otherwise provided by the native schema validation model 410 of the application 305 with which the document 310 is created.

Referring to FIG. 4, according to embodiments of the present invention, a user obtains access to the native schema validation model 410 via one or more application programming interfaces or message calls passed from a third party customized application 430 to the native schema validation model 410, or passed from a third party customized validation model 420 to the native schema validation model 410. In either case, as described above with respect to FIG. 2, according to object-oriented programming environments, a message call passed from the third party customized application 430 or the third party customized validation model 420 to the native schema validation model 410 of a given software application allows the third party to pass, as message parameters, XML schema file attachment information or schema validation model modifications for receipt by the native schema validation model. In return, the native schema validation model may return a value to the third party custom application 430 or to the third party customized validation model 420 to allow the third party user to make modifications to one or more schema files attached to a document 310, or to allow the user to customize the application's native schema validation model 410 to customize the validation rules associated with the native schema validation model 410. For example, if the native schema validation model 410 presents an error to the user upon the entry of mixed XML content into a document 310 where the mixed content includes entry of data into the document 310 not associated with an XML markup element from the attached XML schema file 330, a third party may utilize the application programming interfaces or message calls according to the present invention to modify the native schema validation model 410 to allow mixed content data entry into the document 310 without receiving a validation error by the native schema validation model 410. Other exemplary uses and benefits thereof of exposing the native schema validation model to a user as described herein will be understood from the description that follows.

The following is a description of objects and associated properties comprising application programming interfaces (API) or object-oriented message calls that provide a user direct access to the native schema validation model 410 of an application 305 with which the user is editing a document 310. Following each of the objects or associated properties set out below is a description of the operation and functionality of the object or associated property.

Application object—an object representing the application. The following are properties and methods of this object related to accessing an application's native schema validation model or object.
   XMLValidationError event
   An event firing whenever a schema violation is detected by the application in the document containing XML markup. This event firing can pass the following parameters to an event handler procedure.
   XMLNode—a pointer to the XML node where the violation has been detected.

Document object—an object representing the document. The following are properties and methods of this object related to accessing an application's native schema validation model or object.
   ChildNodeSuggestions property
   A property pointing to a collection of XMLChildNodeSuggestions consisting of all the elements suggested by the application as available for insertion into the current document context based on the schema and the current context.
   XMLSchemaReferences property
   A property pointing to the collection of XMLSchemaReferences representing all the schemas associated with this document.
   XMLSchemaViolations property
   A property pointing to the XMLNodes collection consisting of all the XML nodes in a document that have a schema violation.
   XMLShowAdvancedErrors property
   A property setting determining whether an application shows error messages related to schema validation in an advanced or simpler format.

XMLChildNodeSuggestions collection object—an object that is a collection of XMLChildNodeSuggestion objects representing XML elements suggested to the user by the application based on the XML schema and the current editing context. The following are properties and methods of this object related to accessing an application's native schema validation model or object.
   Application property
   A read only pointer to the Application object representing the application of this object model.
   Count property
   A read only property returning the number of XML schemas in the collection.
   Creator property
   A read only pointer to the creator of the object.
   Item( ) method
   A method for accessing the individual members of this collection using a numerical index or a search keyword. It can accept the following parameters.
   Index—a number representing the position of the requested XMLChildNodeSuggestion object in the collection. The index can also be a text string representing the name of the requested node.
   Parent property
   A read only property returning the parent object of the collection. This property returns a pointer to the document object that the XMLChildNodeSuggestions from which the collection is accessed.

XMLChildNodeSuggestion object—an object representing an XML element suggested by the application as available for insertion in the current editing context based on the XML schema and the current editing context. The following are properties and methods of this object related to accessing an application's native schema validation model or object.
   Application property
   A read only pointer to the Application object representing the application of this object model.
   BaseName property
   A property returning the name of a specified XML element without any prefixes.
   Creator property
   A read only pointer to the creator of the object.
   Insert( ) method
   A method for inserting an XML element suggested into the document. It returns the newly created XML node object. It can accept the following parameters.
   Range—pointing to the part of the document where the suggested XML element is to be applied.
   NamespaceURI property
   A property returning the Namespace of the suggested element.

Parent property
A read only property returning the parent object of this object. This property returns a pointer to the collection of which the XMLChildNodeSuggestion object is a member.

XMLSchemaReference property
A property pointing to the XMLSchemaReference object representing the schema file containing the suggested XML element.

XMLNode object—an object representing an XML node in the document. The following are properties and methods of this object related to accessing an application's native schema validation model or object.

ChildNodeSuggestions property
A property pointing to an XMLChildNodeSuggestions collection consisting of XML elements suggested by the application as possible child nodes of this node based on the XML schema.

SetValidationError( ) method
A method to override validation error notifications from the application's built-in validation model with a programmer's own custom errors. It can also be used to hide schema violations on an individual node basis as well as to enable the programmer to cause schema violations on otherwise valid nodes. It can accept the following parameters.

Status—determined whether a schema violation should be reported on the node or not.

ErrorText—determines the text to show as the schema violation description.

ClearedAutomatically—a flag indicating whether this schema violation will be cleared as soon as the application regains control or not.

Validate( ) method
A method for on-demand validation of specific XML nodes in the document.

ValidationErrorText property
A property returning the description text of the current schema violation on this node.

ValidationStatus
A property indicating the validation status of the node, and distinguishing between valid and any number of invalid states.

XMLSchemaReferences collection object—an object representing a collection of schemas attached to a document. The following are properties and methods of this object related to accessing an application's native schema validation model or object.

Add( ) method
A method to attach a new schema to a document. This method creates, inserts into the collection and returns a new XMLSchemaReference object representing the new schema[w1]. The parameters of this method are as follows. ([NamespaceURI], [Alias], [FileName], [InstallForAllUsers As Boolean=False] The Namespace URI names the namespace and the alias provides a shortened or fanciful name as desired by the developer. The file name includes a file name to which the schema is to be added.

AllowSaveAsXNLWithoutValidation property
A property for controlling whether the application allows the user to save the document as XML even if it violates the schema.

Application property
A read only pointer to the application object representing the application of this object model.

AutomaticValidation property
A property controlling whether the application's real-time schema validation is enabled or not.

Count property
A read only property returning the number of XML schemas attached to the document which is equivalent to the number of XMLSchemaReference objects in the collection.

Creator property
A read only pointer to the creator of the object.

IgnoreMixedContent property
A property that controls whether or not text nodes that have element siblings should be validated. When turned on, this property also prevents those text nodes from being saved into the XML format if the user has chosen to save the non-native XML markup only. This is intended to help prevent text that is inserted into the document by XSLT transformations from being treated as part of the data.

Item( ) method
A method for accessing the individual members of this collection using an numerical index or a search keyword. It can accept the following parameters.

Index—a number representing the position of the requested XMLSchemaReference object in the collection. The index can also be a text string representing the Namespace of the requested schema.

Parent property
A read only property returning the parent object of the collection. This property returns a pointer to the document object that the XMLSchemaReferences from which the collection is accessed.

UnderlineValidationErrors property
A property controlling whether schema violations are highlighted in the document in any way, such as by being underlined.

Validate( ) method
A method to validate the document against all the attached schemas on demand.

XMLSchemaReference object—an object representing an XML schema attached to the document. The following are properties and methods of this object related to accessing an application's native schema validation model or object.

Application property
A read only pointer to the application object representing the application of this object model.

Creator property
A read only pointer to the creator of the object.

Delete( )
A method for removing a schema reference from the document and the corresponding object from the XMLSchemaReferences collection.

Location property
A property returning the location of the schema file.

NamespaceURI property
A property returning the target namespace of the schema file.

Parent property
A read only property returning the parent object of this object. This property returns a pointer to the collection from which the XMLSchemaReference object is a member.

Reload( ) method

A method to reload this particular schema from the file. It is useful when the schema changes outside of the application and now the application needs to get an updated schema definition.

As described herein methods and systems are provided for allowing a user to programmatically call a schema validation model via a set of application programming interfaces or object-oriented message calls whereby the user may call for the execution of executable methods and pass desired properties and parameters to the schema validation model in order to customize the schema validation model or to change controls or settings utilized by the native schema validation model for validating XML markup applied to a document against a given XML schema file. It will be apparent to those skilled in the art that various modifications or variations may be made in the present invention without parting from the scope or spirit of the invention. Other embodiments of the invention will be apparent to those skilled in the art from consideration of the specification and practice of the invention disclosed herein.

We claim:

1. A computer-implemented method, comprising:
   providing access to an extensible markup language (XML) schema validation model of an application program to modify the XML schema validation model as the XML schema validation model will be applied to one or more XML documents to be submitted to the application program, the access being provided by one or more of:
   an application programming interface; and
   a set of message calls;
   passing to the XML schema validation model at least one object property configured to implement a modification in the XML schema validation model to be associated with one or more XML documents, wherein the at least one object property includes an object property for returning one of: a list of all XML schema files associated with a document; a description text of a specified XML schema violation for a specified XML element applied to a document; a location of a specified XML schema file; a Namespace uniform resource identifier associated with a specified XML schema file; a list of all XML elements suggested by the application program based on an XML schema file associated with a document and based on an editing context within the document; and a list of all XML elements in a document associated with an XML schema violation based on an associated XML schema file, wherein the modification includes one or more of:
   a change to an existing XML schema employed by the XML schema validation model; and
   one or more additional XML schemas;
   receiving the modification in the XML schema validation model; and
   applying the XML schema validation model including the modification to the one or more XML documents.

2. The computer-implemented method of claim 1, whereby the at least one object property includes an object property for determining a format of error messages presented by the XML schema validation model related to schema file validations.

3. The computer-implemented method of claim 1, whereby the at least one object property includes passing an object method or accessing one or more individual members of an XML child node suggestions collection as defined by an associated XML schema file and current editing context within a document associated with the XML schema file.

4. The computer-implemented method of claim 1, whereby the at least one object property includes an object method for inserting an XML element into a document whereby the object method includes a range parameter for pointing to a part of the document where the XML element is to be inserted.

5. The computer-implemented method of claim 1, whereby the at least one object property includes an object method for customizing schema validation error notifications from the XML schema validation model.

6. The computer-implemented method of claim 1, whereby the at least one object property includes an object method for requesting validation of a specified XML element applied to a document.

7. The computer-implemented method of claim 1, whereby the at least one object property includes an object method for attaching a user-specified XML schema file to a document.

8. The computer-implemented method of claim 1, whereby the at least one object property includes an object property for directing the XML schema validation model to allow saving a document as an XML document where saving the document as an XML document violates an associated XML schema file.

9. The computer-implemented method of claim 1, whereby the at least one object property includes an object property for causing the XML schema validation model to allow mixed content data entry into a document where the mixed content data entry otherwise violates an associated XML schema file.

10. The computer-implemented method of claim 1, whereby the at least one object property includes an object method for accessing a specified XML schema file associated with a document from a collection of XML schema file references whereby a parameter associated with the specified XML schema reference is passed to the XML schema validation model with the object method.

11. The computer-implemented method of claim 1, whereby the at least one object property includes an object property for controlling whether XML schema violations are highlighted in a document by the XML schema validation model.

12. The computer-implemented method of claim 1, whereby the at least one object property includes an object method requiring the XML schema validation model to validate a document against all XML schema files associated with the document.

13. The computer-implemented method of claim 1, whereby the at least one object property includes an object property for removing an XML schema file reference from a document and for removing the XML schema file reference from a schema file references collection.

14. The computer-implemented method of claim 1, whereby the at least one object property includes an object method to the XML schema validation model for re-associating a specified schema file with a document where the specified schema file was previously removed from association with the document.

15. The computer-implemented method of claim 1, further comprising:
   determining the object property seeks a response by the XML schema validation model;
   receiving the response of the XML schema validation model; and
   providing the response of the XML schema validation model through one of:
   the application programming interface; and
   the set of message calls.

16. A computer-readable storage medium storing instructions executable by a computer system to yield a result, comprising instructions to:
provide a programmable object model allowing a first programming object to apply a modification to an Extensible Markup Language (XML) schema validation model of a second programming object, wherein the XML schema validation model is configured to validate one or more XML documents according to one or more available XML schemas;
configure the programmable object model of the first programming object to communicate with the XML schema validation model of the second programming object by passing at least one object property to the XML schema validation model, wherein the at least one object property is configured to direct the XML schema validation model to one of:
modify operation of the XML schema validation model;
make a change to an existing XML schema employed by the XML schema validation model; and
associate one or more additional XML schemas with the XML schema validation model; and wherein the at least one object property is configured to one or more of: determine a format of error messages presented by the XML schema validation model related to schema file validations; access one or more individual members of an XML child node suggestions collection as defined by an associated XML schema file and current editing context within a document associated with the XML schema file; insert an XML element into a document whereby the object method includes a range parameter for pointing to a part of the document where the XML element is to be inserted; customize schema validation error notifications from the XML schema validation model; request validation of a specified XML element applied to a document; attach a user-specified XML schema file to a document; save a document as an XML document where saving the document as an XML document violates an associated XML schema file; cause the XML schema validation model to allow mixed content data entry into a document where the mixed content data entry otherwise violates an associated XML schema file; access a specified XML schema file associated with a document from a collection of XML schema file references whereby a parameter associated with the specified XML schema reference is passed to the XML schema validation model with the object method; control whether XML schema violations are highlighted in a document by the XML schema validation model; require the XML schema validation model to validate a document against all XML schema files associated with the document; remove an XML schema file reference from a document and for removing the XML schema file reference from a schema file references collection; and re-associate a specified schema file with a document where the specified schema file was previously removed from association with the document.

17. The computer-readable storage medium of claim 16, wherein the programmable object model is configured to communicate with the XML schema validation model of the second programming object using one or more of:
an application programming interface; and
a set of message calls.

18. The computer-readable storage medium of claim 16, further comprising one or more additional object properties configured to receive information from the XML schema validation model, the information including one or more of:
a list of all XML schema files associated with a document;
a description text of a specified XML schema violation for a specified XML element applied to a document;
a location of a specified XML schema file;
a Namespace uniform resource identifier associated with a specified XML schema file;
a list of all XML elements suggested by the application program based on an XML schema file associated with a document and based on an editing context within the document; and
a list of all XML elements in a document associated with an XML schema violation based on an associated XML schema file.

19. A computer-readable storage medium storing instructions executable by a computer system to yield a result, comprising instructions to:
provide an interface to an XML schema validation model associated with a programming object to receive a modification to one or more XML schemas to be used by the XML schema validation model presented to validate one or more XML documents presented to the programming object; wherein the interface includes one of: an application programming interface providing access to the XML schema validation model; and a set of message calls to which the XML schema validation model is responsive;
configure the interface to receive at least one object property configured to:
modify operation of the XML schema validation model;
modify an XML schema used by the XML schema validation model; and
add an additional XML scheme for use by the XML schema validation model;
direct the XML validation model to apply at least one of the modified XML schema and the additional XML schema to validate the one or more XML documents; and
one or more additional object properties to which the XML schema validation model will provide information via the interface, the information including one or more of: a list of all XML schema files associated with a document; a description text of a specified XML schema violation for a specified XML element applied to a document; a location of a specified XML schema file; a Namespace uniform resource identifier associated with a specified XML schema file; a list of all XML elements suggested by the application program based on an XML schema file associated with a document and based on an editing context within the document; and a list of all XML elements in a document associated with an XML schema violation based on an associated XML schema file.

20. The computer-readable storage medium of claim 19, wherein the at least one object property is configured to at least one of:
determine a format of error messages presented by the XML schema validation model related to schema file validations;
access one or more individual members of an XML child node suggestions collection as defined by an associated XML schema file and current editing context within a document associated with the XML schema file;

insert an XML element into a document whereby the object method includes a range parameter for pointing to a part of the document where the XML element is to be inserted;

customize schema validation error notifications from the XML schema validation model;

request validation of a specified XML element applied to a document;

attach a user-specified XML schema file to a document;

save a document as an XML document where saving the document as an XML document violates an associated XML schema file;

cause the XML schema validation model to allow mixed content data entry into a document where the mixed content data entry otherwise violates an associated XML schema file;

access a specified XML schema file associated with a document from a collection of XML schema file references whereby a parameter associated with the specified XML schema reference is passed to the XML schema validation model with the object method;

control whether XML schema violations are highlighted in a document by the XML schema validation model;

require the XML schema validation model to validate a document against all XML schema files associated with the document;

remove an XML schema file reference from a document and for removing the XML schema file reference from a schema file references collection; and re-associate a specified schema file with a document where the specified schema file was previously removed from association with the document.

* * * * *